(12) United States Patent
Davis

(10) Patent No.: US 6,579,170 B1
(45) Date of Patent: Jun. 17, 2003

(54) RIGID FOAM AIR DUCT SYSTEM

(76) Inventor: Jeffrey A. Davis, 550 Dawson Rd., Cumberland Furnace, TN (US) 37051

( * ) Notice: Subject to any disclaimer, the term of this patent is extended or adjusted under 35 U.S.C. 154(b) by 0 days.

(21) Appl. No.: 09/928,915

(22) Filed: Aug. 13, 2001

Related U.S. Application Data

(60) Provisional application No. 60/224,626, filed on Aug. 11, 2000.

(51) Int. Cl.[7] ................................................ F24F 7/04
(52) U.S. Cl. ................ 454/232; 138/149; 428/309.9; 428/319.1
(58) Field of Search ........................... 454/233, 232; 138/140, 149; 428/314.1, 319.1, 309.9; 156/331.7; 264/46.5

(56) References Cited

U.S. PATENT DOCUMENTS 3,496,058 A * 2/1970 Schroter et al.
4,986,496 A * 1/1991 Marentic et al. ............. 244/130
2001/0014387 A1 * 8/2001 Giampaolo ............... 428/314.4

FOREIGN PATENT DOCUMENTS

DE 200 02 139 * 6/2000

* cited by examiner

Primary Examiner—Harold Joyce
(74) Attorney, Agent, or Firm—Waddey & Patterson, P.C.; Mark J. Patterson; Howard H. Bayless

(57) ABSTRACT

An air duct that comprises one or more air duct segments that comprises a polymeric cellular material, or foam. The ducts or segments may be part of an air duct system that comprises a primary air duct, at least one secondary air duct, and at least one branch duct. Each of the aforementioned ducts comprises a cellular thermoset polymeric material. Additionally, the present invention relates to an HVAC system that comprises an HVAC unit for thermally conditioning air, and a duct system comprising a polymeric cellular material, or foam that has an R value of at least 5, and a density of from about 1.5 pounds per cubic foot to about 4 pounds per cubic foot.

37 Claims, 4 Drawing Sheets

RIGID FOAM DUCTWORK - 6" BRANCH LINE

SUPPLY DUCT - BRANCH LINE CONNECTOR

RIGID FOAM AIR DUCT SYSTEM

This application claims priority to Provisional Application No. 60/224,626, filed Aug. 11, 2000, the contents of which are incorporated herein by reference.

FIELD OF THE INVENTION

This invention relates generally to air ducts used in commercial and residential HVAC systems. Additionally, this invention pertains to HVAC air duct systems and methods for fabrication and assembly of air duct systems.

BACKGROUND OF THE INVENTION

The fabrication and installation of ductwork for use in residential and commercial HVAC systems is an expensive and time-consuming process. Duct work in prior art HVAC system typically includes rigid metal duct and fittings, as shown in FIG. 1. These ducts are heavy and usually need an extensive external support system. They have very poor insulation qualities and are difficult to cut, trim and fit on-site. In some applications, flexible insulated duct is used but these flexible ducts have little integral structural support and are susceptible to being crushed or damaged during normal installation handling. Improper fittings contribute to the inefficiency of prior art systems. The poor insulation qualities of the prior art duct systems require the system to extend its run time to replace the conditioned air lost due to inefficiencies. This contributes to an overall less efficient system.

The following patents and publications help illustrate the state of the art and are all expressly incorporated by reference in their entirety.

U.S. Pat. No. 5,210,947 to Donnelly discloses a process of manufacturing a duct by extruding a tubular casing composed of a polymeric foam.

U.S. Pat. No. 4,615,411 to Breitscheidel, et al. discloses a flow duct for conveying air that has an outer layer of molded thermoplastic closed cell foam material.

U.S. Pat. No. 5,487,412 to Matthews, et al. discloses a glass fiber air duct for conveying an air stream. It is coated with a polymeric coating comprising an organic biocide.

U.S. Pat. No. 5,795,634 to Fukui discloses a noise reducing duct that comprises an open-cell foam layer formed by helically winding and open cell foam resin banded onto an outer circumferential face of a inner layer.

U.S. Pat. No. 5,944,060 to MacKay discloses a composite duct system that comprises a fiber reinforced resin system and a foam portion that is formed of fire retarding material derived from a resin system.

U.S. Pat. No. 6,062,270 to Hultberg, et al. discloses a double-walled ventilation duct system with an inner tube, an outer tube, and arranged therebetween, a sound-absorbing material. The sound absorbing material may be wool, or other sound-absorbing material.

U.S. Pat. No. 5,634,847 to Shea discloses a fiberglass reinforced plastic fume exhaust system that includes duct walls therein covered with multiple thermoplastic resins which melt when exposed to high temperatures.

G. F. Baumann, et al., Alternate Blowing Agent Options And Polyisocyanurate Laminate Foams, 32nd Annual Polyurethane Technical/Marketing Conference, 1989, summarize the CFC alternate options for Class I PIR laminate foams.

Ohnuma, et al., Urethane Modified Polyisocyanurate Foams For Spray Application, 32nd Annual Polyurethane Technical/Marketing Conference, 1989, disclose a foam spray system with improved flame retardancy.

Gluck, et al., Carbon Black-Filled Foam Insulations, 32nd Annual Polyurethane Technical/Marketing Conference, 1989, disclose the advantages of the addition of carbon black-filler to isocyanurate foams.

U.S. Pat. No. 3,899,005 discloses a modular duct system for flexible, elongated articles such as telephone cables. The duct system of this invention comprises conduits formed of translucent, resin bonded glass fibers.

U.S. Pat. No. 3,819,209 discloses a duct connector that included a collar made of flexible material having a flange at one end thereof extending around its periphery.

What is needed, then, is a duct system for HVAC systems that is rigid, insulated, relatively light in weight, and is easy to install and connect on site in a variety of configurations.

The present invention provides a duct, duct system, and an HVAC system comprising the ducts of the present invention that achieve the goals of providing well insulated, light weight ducts that are cost effective and easy to handle and install.

SUMMARY OF THE INVENTION

The present invention overcomes the limitations of the prior art by using multiple sections of rigid foam duct in the assembly of a residential or commercial HVAC air duct system. Although many different duct work shapes are feasible, each piece of duct is preferably formed into a square, rectangular or round pipe configuration (of various lengths and sizes) from a cellular polymeric material. The round pipe configuration is most preferable. Furthermore, the polymeric material is preferably a polyurethane material.

The duct sections may include end and/or side branch fittings that allow for easy interconnection of different duct sections in order to form a complete system. Thus, the duct sections can be used to quickly assemble and install HVAC duct systems of varying configurations on-site. The polyurethane material provides rigidity and insulative qualities while being light in weight and easy to handle.

One embodiment of the present invention is an air duct that comprises one or more air duct segments. Each segment is disposed longitudinally relatively to an axis parallel to air flow, and each segment comprises a wall that defines an internal space that permits flow of air. The wall has an outer shell, an inner shell, and a first core layer disposed between the outer shell and the inner shell. The core comprises a polymeric cellular material, or foam.

Another embodiment of the present invention is an air duct system that comprises a primary air duct, at least one secondary air duct, and at least one branch duct. Each of the aforementioned ducts comprises a wall that has an outer shell, an inner shell, and a core layer positioned between the outer and inner shells. The core layer of each duct comprises a cellular thermoset polymeric material.

Finally, another embodiment of the present invention is an HVAC system that comprises an HVAC unit for thermally conditioning air, a blower to direct the thermally conditioned air, a primary air duct to receive the conditioned air, and to discharge the conditioned air to conditioned space, at least one branch line duct to further direct conditioned air to conditioned space; and a control unit to control the blower. In this embodiment, the primary air duct and the at least one branch line duct comprise a thermoset resin material, have an R value of at least 5, and a density of from about 1.5 pounds per cubic foot to about 4 pounds per cubic foot.

DETAILED DESCRIPTION OF THE PREFERRED EMBODIMENTS

Figure 1:
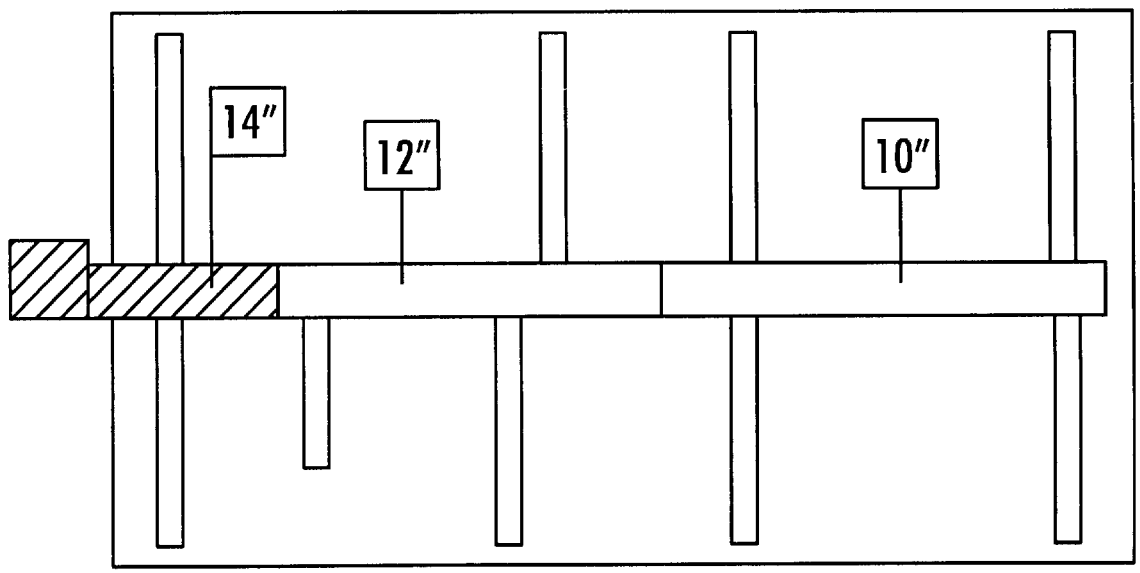
FIG. 1 is a schematic diagram of a typical prior art residential HVAC air duct system.

As stated above, the present invention relates to an air duct, and air duct system and a HVAC system.

With respect to the air duct of the present invention, there are one or more air duct segments that, like typical prior art air ducts, are disposed longitudinally relatively to an axis parallel to air flow. The air ducts of the present invention have a wall defining an internal space that permits flow of air. The wall has an outer shell, an inner shell, and a first core layer disposed between the outer shell and the inner shell.

The make-up of the outer shell or outer skin and the inner shell or inner skin is not known to be critical as long as the objectives of the invention are achieved. That is, the outer shell and the inner shell must not impair the insulating characteristics, rigidity characteristics, and light weight characteristics. In some instances, the outer shell and, to a lesser extent, the inner shell will help provide the rigidity to the duct segment. The inner shell should be adopted to be in contact with the air stream.

Additionally, the outer shell and the inner shell may be the same or different. On one embodiment, the outer shell and the inner shell may be aluminum, similar to the aluminum shells currently in use with respect to duct work. In another embodiment, the inner shell and the outer shell may be a polymeric material. In that embodiment, the polymeric material is preferably a thermoset material, more preferably a polyurethane material. The outer shell and the inner shell may be the same material that comprises the core. In such an embodiment, however, the outer shell and the inner shell would preferably have a different density resulting from a differential in the molding process. Finally, the outer shell and the inner shell may be different materials one to the other. For instance, the outer shell may be polyurethane and the inner shell may be an aluminum shell. Additionally, it is believed that the use of different materials in the outer shell, core, and inner shell may help prevent ingress by rodents.

Preferably the outer shell has a thickness of about 1/64 inches to 1 inch, more preferably about 1/32 inches. When the outer shell comprises a polyurethane material, a most preferred thickness is about 1/32 inches.

Preferably the inner shell has a thickness of about 1/64 inches to 1 inch, more preferably about 1/32 inches. When the inner shell comprises a polyurethane material, a most preferred thickness is about 1/32 inches.

In one embodiment, at least one of the outer shell and the inner shell are comprised of a thermoset polymer resin.

As stated above, the core for the air ducts of the present invention comprises a polymeric cellular material. Preferably, the polymeric cellular material comprises a thermoset resin. More preferably, the thermoset resin comprises a polyurethane resin.

The resin is a closed cell cellular material resin (i.e., a foam). Preferably, the closed cell content of the cellular material is from about 50% to about 99%. More preferably, the closed cell content of the cellular material is from about 75% to about 99%. More preferably, the closed cell content of the cellular material is from about 90% to about 99%. Most preferably, the closed cell content of the cellular material is about 97%. An important advantage of the duct segments of the present invention is the relative light weight of the segments. Preferably the air ducts of the present invention have a ASTM D 1622–63 density of about 1.0 pounds per cubic foot (pcf) to about 4.0 pcf. Most preferably, the ASTM D 1622–63 density is about 2.0 pcf.

In a preferred embodiment of the present invention, when the wall is about 2 inches in thickness and the air duct segment weight is about 0.3 pounds per linear foot to about 6.8 pounds per linear foot. In another embodiment of the present invention, when the wall is about 1 inch thick and the air duct segment weight is about 0.13 pounds per linear foot to about 3.2 pounds per linear foot.

Another important advantage of the present invention is the high R-value. The R-value is a measurement common in the industry that measures resistance to heat flow. The higher the R-value, the greater the insulating power. In the HVAC duct industry, an R-value of 9 is recognized as zero loss (as per ACCA (Air Conditioning Contractors of America) Manual J, Seventh Addition) with respect to the insulative abilities of the material. With respect to the air ducts of the present invention, the R-value is preferably at least 5.

If the thickness of the wall of a duct of the present invention is about one inch, the R value is at least about 7 and preferably at least 7.5. When the wall of a duct of the present invention is about 2 inches thick, the duct preferably has an R value of at least 10, preferably 12, and more preferably about 14 or higher. Preferably, in the air duct segments of the present invention, the R value is at least 5 per inch of wall thickness. More preferably, the R value is at least 7 per inch of wall thickness.

In a preferred embodiment, the thermoset material is a polyol and isocyanate blend. Preferably, the polyol and isocyanate blend is blended at a ratio of from about 0.5:1.5 polyol/isocyanate to about 1.5:0.5 polyol/isocyanate. Most preferably, the ratio is 1:1.

An example of a polyol/isocyanate blend of the present invention is RICHPANEL EB 103-3110 (polyol blend) and EB 103-2427 (polymeric isocyanate) available from Carpenter Company, Richmond, Va.

Preferably the air ducts of the present invention are used in residences and in commercial businesses. In such a case, the air duct cannot provide a fire hazard to the premises. Therefore, the air ducts of the present invention have acceptable flame spread ratings and smoke density ratings. Preferably, the air duct segments of the present invention have an ASTM E-84 flame spread rating of less than about 25 and an ASTM E-84 smoke density rating of less than about 450 at a thickness of about 4 inches.

The air ducts, or air duct segments of the present invention may vary greatly in diameter depending on the needs involved. Residential or commercial air ducts, at least the first or primary sections, may have a diameter of about 12 to about 36 inches. Branches of the primary sections may be as small as about 5 inches in diameter.

The ducts of the present invention may be made as follows:

A mold of the duct segment or fitting is produced using a two part silicone. The silicone and hardener are mixed mechanically and then poured around the segment or fitting to be reproduced. This process is used to form the inner and outer molds. Part A and Part B are then mixed mechanically or by a dispensing unit and poured into the cavity to form the segment or fitting. The mixture is allowed to free-rise and fill the cavity. Normally the segment or fitting can be removed from the mold in less than (10) ten minutes. The component can be handled and assembled into a duct system within (1) one hour.

When the outer shell is comprised of a polymeric resin, a color providing additive may be added if desired by one of ordinary skill in the art. Accordingly, in commercial applications, for example, if the ducts are visible because of necessity or consumer design, color treatment after installation will not be required.

The air ducts or air duct segments discussed above may be part of another embodiment of the present invention, an air duct system. The air duct system of the present invention comprises a primary air duct comprising a wall that has an outer shell, an inner shell, and a core layer positioned between the outer and inner shells; at least one secondary air duct comprising a wall that has an outer shell, an inner shell, and a core layer positioned between the outer and inner shells; and at least one branch duct comprising a wall that has an outer shell, an inner shell, and a core layer positioned between the outer and inner shells. The primary duct, secondary air duct, and the branch duct comprise a cellular thermoset polymeric material and may be the duct and duct segments discussed above. Thus, preferably the thermoset polymeric resin is the polyurethane resin discussed above.

The segments of the duct system may be joined one to the other as follows:

The duct segments may be cut with a fine tooth saw or with a knife. The duct segments and fittings can then be assembled with glue. A glue comprised of a two part polyol and isocyanate blend having a work time of at least one (1) minute. The glue is applied to the duct segment and the fitting which are held together while glue sets.

The air duct system of the present invention may be part of an overall HVAC system, comprising an HVAC unit for thermally conditioning air; a blower to direct the thermally conditioned air; a control unit to control the blower; and the duct system discussed above. Preferably, the duct system of the HVAC system of the present invention comprises a duct segment that comprises a thermoset resin material, has an R value of at least 5, and has a density of from about 1.5 pounds per cubic foot to about 4 pounds per cubic foot. The blower is not known to be critical and the HVAC system of the present invention may use existing blowers and blower control units when replacing commercial and residential duct systems.

Figure 2:
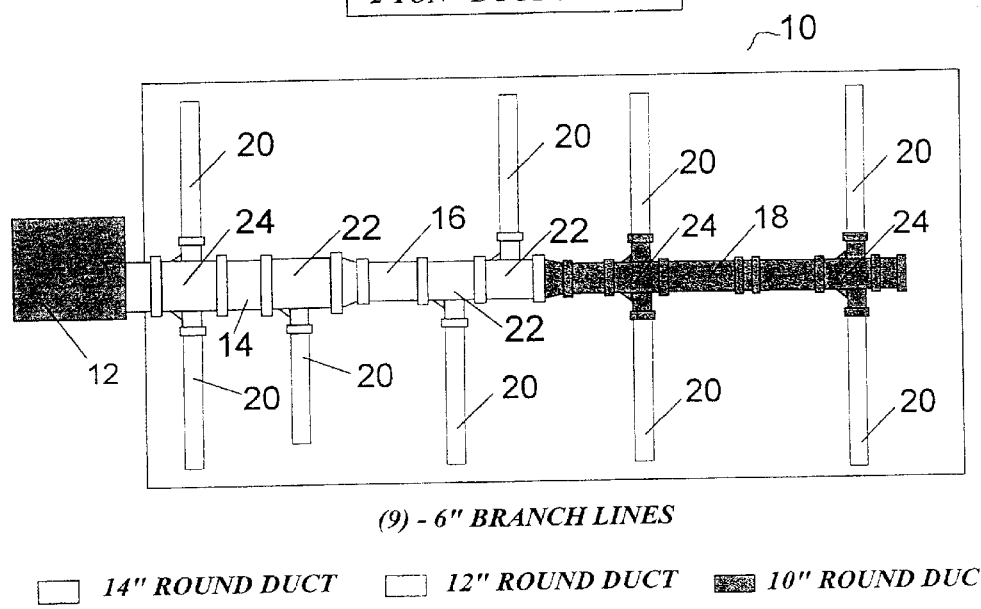
FIG. 2 is a schematic diagram of one embodiment of a rigid foam air duct system fabricated and assembled for residential use in accordance with the present invention.
Figures 5, 6:
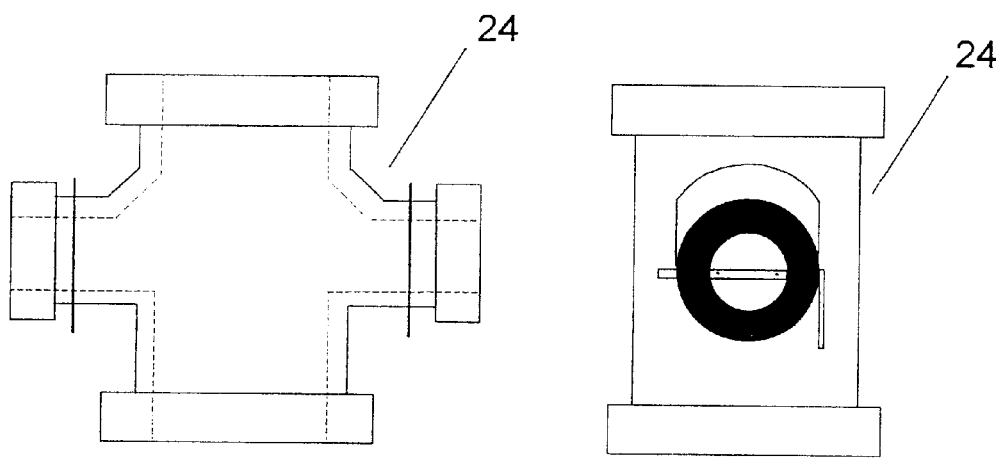
FIG. 5 is a phantom plan view of a supply duct take-off used in the rigid foam duct system of the present invention.
FIG. 6 is a side view of the supply duct take-off shown in FIG. 5.
Figure 7:
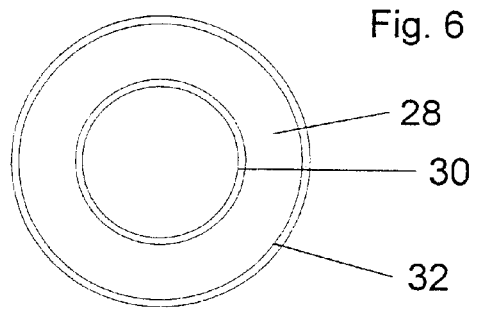
FIG. 7 is a cut-away view of a duct of the present invention.

Turning now to the remaining drawings, one embodiment of the rigid foam duct system 10 of the present invention is shown in FIG. 2. Forced air from the HVAC system originates at an air plenum/blower 12 and is delivered to a 14" round primary air duct 14. This embodiment will also typically include 12" round duct 16 and 10" round duct 18. Multiple 6" branch lines 20 are connected to corresponding primary (trunk line) ducts 14, 16, 18 using single (22) or multiple (24) take-off fittings (FIGS. 5 and 6). The take-off fittings 22, 24 are also used to connect the trunk line duct sections14, 16, and 18.

Take-off fittings used in prior art are as follows: one type is a dove-tailed sheet metal fitting usually made from the same pipe used for the branch line. This sheet metal pipe consists of a 6"–8" long piece of pipe with 1" slits cut on one end of the pipe spaced approximately 1" apart around the entire circumference. A third ($\frac{1}{3}$) of the tabs are bent perpendicular to the pipe. A hole is cut in the supply trunk line and the takeoff is inserted into the opening. The remaining two-thirds ($\frac{2}{3}$) of the tabs are then bent inside the pipe holding it in place. Sheet metal screws are then used to secure the takeoff and the area where the two ducts intersect is sealed with tape or mastic sealant. A damper can then be installed into the takeoff by drilling two ($\frac{1}{4}$) one-quarter inch holes in the duct and inserting a damper kit. The branch line is then ready to connect to the takeoff.

Figure 3:
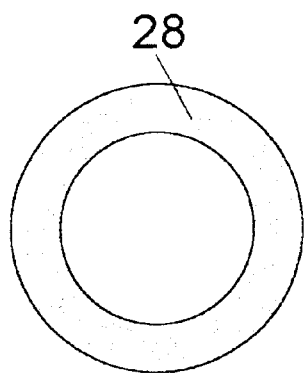
FIG. 3 is an end view of one embodiment of a branch line rigid foam air duct fabricated schematic diagram of one embodiment of a rigid foam air duct system fabricated in accordance with the present invention.
Figure 4:
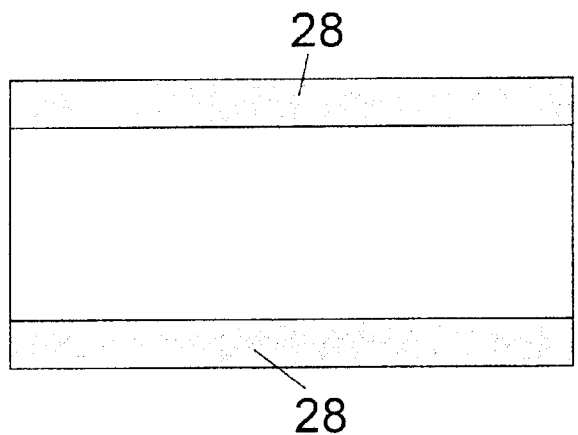
FIG. 4 is a side cutaway view of the branch line rigid foam air duct of FIG. 3.

Sectional views of a typical section of duct 14, 16, or 18 are shown in FIGS. 3 and 4. The foam core 28 of the duct provides an insulating barrier and the inner wall 30 and outer wall 32 provides structural support as discussed above.

Preferably, the duct segments of this embodiment are manufactured of polyurethane foam having a material density within a range of 1 lb. per cubic foot to 5 lb. per cubic foot. The duct and fittings are manufactured using a pour in place or extrusion. As stated above, the duct is preferably formed in round shape but may also be rectangular, triangular, oval, octagonal or any other moldable form.

For conventional HVAC systems, the duct system will be comprised of duct sections ranging from one foot in length to ten feet in length. However those skilled in the art would recognize that duct of, any length can be produced. The length may vary based on the application. Preferably 45-degree takeoff fittings will be used. A fitting with one branch line connection 22 as well as fittings with two branch line connections 24 will be used. All connections will have volume dampers installed.

The system 10 can also include standard tees. 90 degree ell's, 45 degree ell's, wye fittings, and caps for the end of the trunk line will be produced for the following standard sizes 5", 6", 7", 8", 10", 12", 14", 16", 18", 20", 22", 24", 26", 28", 30", 32", 34" , and 36" and for any other desired sizes for many applications.

Rectangular duct will be produced with similar fittings in the following standard sizes: 8" in height, with widths of 8", 10", 12", 14", 16", 18", 20", 22", 24"; and 10" in height with widths of 10", 12", 14", 16", 18", 20", 22", 24", 26", 28", and 30", and in any other desired sizes.

Preferably the HVAC systems of the present invention are comprised of the following:

Return duct fittings coming from the filter grille will go down through the floor between the floor joists and provide a fitting to connect to trunk duct under the house. Fittings can be produced with threaded or slip-type connections. Other custom fittings could also be produced.

Some equipment is designed for installation of a filter in the bottom of the equipment on these systems a return duct system is not incorporated into the duct system.

Other equipment is designed for a return trunk duct to connect to the outdoor unit run under the house, up through the floor and terminate at the return air filter grille.

Other features of the invention will become apparent in the course of the following examples which are given for illustration of the invention and are not intended to be limiting thereof.

EXAMPLE 1

This example demonstrates typical R-values of a duct of the present invention when the duct is comprised of a polyol/isocyanate blend at approximately a 1:1 ratio, and a free rise density of approximately 2 lbs. per cubic foot.

| duct thickness (inches) | R-Value |
|---|---|
| 1" | R-7.69 |
| 1.2" | R-9.23 |
| 1.4" | R-10.77 |
| 1.6" | R-12.30 |
| 1.8" | R-13.84 |
| 2.0" | R-15.38 |
| 2.2" | R-16.92 |
| 2.4" | R-18.46 |
| 2.6" | R-19.99 |
| 2.8" | R-21.53 |
| 3.0" | R-23.07 |
| 3.2" | R-24.61 |
| 3.4" | R-26.15 |
| 3.6" | R-27.68 |
| 3.8" | R-29.22 |
| 4.0" | R-30.76 |

EXAMPLE 2

This example demonstrates typical duct segment weights in pounds per linear foot for the ducts of example 1, above.

| duct size (id) | thickness (inches) | | | |
|---|---|---|---|---|
| | 1 | 2 | 3 | 4 |
| 5 | 0.2617 | 0.6106 | 1.0467 | 1.5700 |
| 6 | 0.3053 | 0.6978 | 1.1775 | 1.7444 |
| 7 | 0.3489 | 0.7850 | 1.3083 | 1.9189 |
| 8 | 0.3925 | 0.8722 | 1.4392 | 2.0933 |
| 10 | 0.4797 | 1.0467 | 1.7008 | 2.4422 |
| 12 | 0.5669 | 1.2211 | 1.9625 | 2.7911 |
| 14 | 0.6542 | 1.3956 | 2.2242 | 3.1400 |
| 16 | 0.7414 | 1.5700 | 2.4858 | 3.4889 |
| 18 | 0.8286 | 1.7444 | 2.7475 | 3.8378 |
| 20 | 0.9158 | 1.9189 | 3.0092 | 4.1867 |
| 22 | 1.0031 | 2.0933 | 3.2708 | 4.5356 |
| 24 | 1.0903 | 2.2678 | 3.5325 | 4.8844 |
| 26 | 1.1775 | 2.4422 | 3.7942 | 5.2333 |
| 28 | 1.2647 | 2.6167 | 4.0558 | 5.5822 |
| 30 | 1.3519 | 2.7911 | 4.3175 | 5.9311 |
| 32 | 1.4392 | 2.9656 | 4.5792 | 6.2800 |
| 34 | 1.5264 | 3.9401 | 4.8408 | 6.6289 |
| 36 | 1.6136 | 3.3144 | 5.1025 | 6.9778 |

All cited patents and publications referred to in this application are herein expressly incorporated by reference.

This invention thus being described, it will be obvious that the same may be varied in many ways. Such variations are not to be regarded as a departure from the spirit and scope of the present invention, and all such modifications as would be obvious to one of ordinary skill in the art are intended to be included within the scope of the following claims.

I claim:

1. An air duct comprising:
   one or more air duct segments, each segment disposed longitudinally relatively to an axis parallel to air flow, each segment comprising a wall defining an internal space that permits flow of air, said wall having:
   an outer shell,
   an inner shell, wherein at least one of said outer and inner shells comprises:
   a shell polymeric cellular material, and
   a first core layer disposed between the outer shell and the inner shell,
   said core comprising:
   a core polymeric cellular material.

2. The air duct of claim 1, wherein:
   said core polymeric cellular material comprises a core thermoset resin.

3. The air duct of claim 2, wherein:
   the core thermoset resin comprises a core polyurethane resin.

4. The air duct of claim 2, wherein:
   the core thermoset resin is a core polyol and isocyanate blend.

5. The air duct of claim 1, wherein said one or more air duct segments have an ASTM E-84 flame spread rating of less than about 25 and an ASTM E-84 smoke density rating of less than about 450 at a thickness of about 4 inches.

6. The air duct of claim 1, wherein the core has a ASTM D 1622–63 density of about 1.0 pounds per cubic foot (pcf) to about 4.0 pcf.

7. The air duct of claim 6, wherein the core ASTM D 1622–63 density is about 2.0 pcf.

8. The air duct of claim 4, wherein the core polyol and isocyanate blend is blended at a ratio of from about 0.5:1.5 polyol/isocyanate to about 1.5:0.5 polyol/isocyanate.

9. The air duct of claim 4, wherein the core polyol and isocyanate blend is blended at a ratio of from about 1:1 polyol/isocyanate.

10. The air duct of claim 1, wherein the closed cell content of the core cellular material is from about 50% to about 99%.

11. The air duct of claim 1, wherein the closed cell content of the core cellular material is from about 75% to about 99%.

12. The air duct of claim 1, wherein the closed cell content of the core cellular material is from about 90% to about 99%.

13. The air duct of claim 1, wherein the closed cell content of the core cellular material is about 97%.

14. The air duct of claim 1, wherein the R value is at least 5.

15. The air duct of claim 1, wherein the wall is about 2 inches in thickness and has a R value of at least 12.

16. The air duct of claim 1, wherein the wall is about 2 inches in thickness and the air duct segment weight is about 0.3 pounds per linear foot to about 6.8 pounds per linear foot.

17. The air duct of claim 1, wherein the wall is about 1 inch thick and the air duct segment weight is about 0.13 pounds per linear foot to about 3.2 pounds per linear foot.

18. The air duct of claim 1, wherein the R factor is at least 5 per inch of wall thickness.

19. The air duct of claim 1, wherein the shell polymeric cellular material is comprised of a thermoset polymer resin.

20. The air duct of claim 1, wherein the diameter of the air duct segment is from about 5 inches to about 36 inches.

21. The air duct of claim 1, wherein at least one of the outer shell and the inner shell are further comprised of a metal barrier.

22. The air duct of claim 21, wherein the metal barrier is an aluminum foil.

23. The air duct of claim 1, wherein the outer shell is comprised of a shell polymeric cellular material and further comprises a color providing additive.

24. An air duct system comprising:
- a primary air duct comprising a wall that has an outer shell, an inner shell, and a core layer positioned between the outer and inner shells;
- at least one secondary air duct comprising a wall that has an outer shell, an inner shell, and a core layer positioned between the outer and inner shells;
- at least one branch duct comprising a wall that has an outer shell, an inner shell, and a core layer positioned between the outer and inner shells;
- wherein the at least one of the outer shell and inner shell for the primary air duct, the at least one secondary air duct, and the at least one branch duct comprises a shell cellular thermoset polymeric resin, and
- wherein the core layer for the primary air duct, the at least one secondary air duct, and the at least one branch duct comprises a core cellular thermoset polymeric resin.

25. The air duct system of claim 24, wherein the core thermoset polymeric resin comprises a core polyurethane resin.

26. The air duct system of claim 25, wherein the core polyurethane resin is a core polyol/isocyanate blend.

27. The air duct system of claim 25, wherein the core has a ASTM D 1622–63 density of about 1.0 to about 4.0 pounds per cubic foot.

28. The air duct system of claim 25, wherein the closed cell content of the core cellular thermoset resin is from about 50% to about 99%.

29. The air duct system of claim 25, wherein the closed cell content of the core cellular thermoset resin is from about 75% to about 99%.

30. The air duct system of claim 24, wherein the R value of the air duct system is at least 7.

31. The air duct system of claim 24, wherein the R value is about 7 multiplied by the thickness of the wall.

32. The air duct system of claim 24, wherein at least one of the outer shell and the inner shell comprise a shell thermoset polymeric material.

33. The air duct system of claim 24, wherein at least one of the outer shell and the inner shell further comprise a metal barrier.

34. The air duct system of claim 33, wherein the metal barrier is an aluminum foil.

35. The air duct system of claim 24, further comprising:
- a return air duct comprising a wall that has an outer shell, an inner shell, and a core layer positioned between the outer and inner shells;
- wherein the at least one of the outer shell and inner shell for the return air duct comprises a shell cellular thermoset polymeric material, and
- wherein the core layer for the return air duct comprises a core cellular thermoset polymeric material.

36. The air duct system of claim 24, wherein the outer shell is comprised of a shell polymeric cellular material and further contains a color providing additive.

37. An HVAC system, comprising:
- an HVAC unit for thermally conditioning air;
- a blower to direct the thermally conditioned air;
- a primary air duct to receive the conditioned air, and to discharge the conditioned air to conditioned space, said primary duct comprising a wall that has an outer shell, an inner shell, and a core layer positioned between the outer and inner shells;
- at least one branch line duct to further direct conditioned air to conditioned space, said at least one branch duct comprising a wall that has an outer shell, an inner shell, and a core layer positioned between the outer and inner shells;
- an air return system; and
- a control unit to control the blower;
- wherein the primary air duct and the at least one branch line duct comprise a thermoset resin material, have an R value of at least 7, and a density of from about 1.5 pounds per cubic foot to about 4 pounds per cubic foot.

* * * * *